United States Patent [19]

Crochet et al.

[11] Patent Number: 5,762,088

[45] Date of Patent: Jun. 9, 1998

[54] METHOD AND APPARATUS FOR GAUGING CLEARANCE ON A TANKER RAILCAR CHECKVALVE

[75] Inventors: Kevin Crochet, Metairie; Edward A. Sentilles, III, Lacombe, both of La.

[73] Assignee: ProVaCon, Inc., Reserve, La.

[21] Appl. No.: 554,673

[22] Filed: Nov. 7, 1995

[51] Int. Cl.$^6$ .................................................. F16K 51/00
[52] U.S. Cl. ........................... 137/15; 137/315; 137/347; 251/291; 105/358
[58] Field of Search ........................ 137/15, 315, 551, 137/347, 348–350; 251/291; 105/358, 360

[56] References Cited

U.S. PATENT DOCUMENTS

| | | | |
|---|---|---|---|
| 1,650,406 | 11/1927 | Weleker | 251/291 |
| 2,092,926 | 9/1937 | Lithgow | 137/347 |
| 4,194,523 | 3/1980 | Lubieniecki | 251/291 |

*Primary Examiner*—A. Michael Chambers
*Attorney, Agent, or Firm*—Roy, Kiesel & Tucker

[57] ABSTRACT

Disclosed is a gauging device for use in a tanker railcar having a manway cover for attaching a valve having a valve stem, that the manway cover having an opening and a valve mounting recess, a checkvalve positioned in that the manway opening, that the checkvalve having a valve stem contact area, that the gauging device having a plate sized to fit across that the manway cover opening and engage that the valve mounting recess on that the manway cover and that the plate having an opening therethrough, that the opening positioned to substantially align with that the valve stem contact area of a checkvalve. Slidable in that the opening in that the plate is a calibration member, that the calibration member having one end adapted to engage that the valve stem contact area of a check valve and that the calibration member having at least one indicia placed thereon for indicating that the relative position of a checkvalve contact area with respect to a valve stem.

11 Claims, 4 Drawing Sheets

METHOD AND APPARATUS FOR GAUGING CLEARANCE ON A TANKER RAILCAR CHECKVALVE

TECHNICAL FIELD

This invention relates to methods an devices for gauging clearance of checkvalves, and more particularly, to checkvalves attached to tanker railcars.

BACKGROUND ART

Because tanker railcars are used to transport hazardous or toxic substances, the devices suitable for use as valves atop a tanker railcar are highly regulated by various industry groups and governmental agencies. Valves and actuators for tanker railway cars are subject to severe limitations due to standards imposed by various governing bodies, such as The Chlorine Institute and the American Association of Railroads. For instance, a valve and actuator in combination must be attachable to the industry standard manway cover which covers the openings in the tanker railcar. The standard manway provides for the attachment of four valves; two for liquids and two for gasses. Each valve bolts to the manway cover, partially seating in a manway cover recess. The recess usually will have a gasket interposed between the valve and manway cover.

Further, all four valves must fit within the confines of the dome covering the manway. Each valve is designed to operate in conjunction with a normally closed checkvalve attached to and fully enclosed in the interior of the tanker railcar and manway cover. That is, when the valve is operated to load or unload a tanker railcar, the valve must open a channel between the outlet port of the valve and the interior of the tanker; consequently, the valve must open the closed checkvalve. The normally closed checkvalve acts as a safety device: the checkvalve would remain closed and in place preventing spills in the event of an accident where the railcar derails and rolls, shearing off those valves sitting atop the tanker railcar.

In the normal course of business, it is sometimes necessary to remove a valve/actuator either for repair or replacement. When installing a repaired or replaced valve/actuator, it is desired to have the valve/actuator properly positioned with respect to the checkvalve, that is, that the proper clearance between the valve/actuator and checkvalve be established. If the clearance between the valve/actuator and checkvalve is too great, then the checkvalve will not fully open when activated, causing unnecessary delays in the loading or unloading process. If the clearance is insufficient, the valve could keep the checkvalve from fully closing and sealing. The recommended standard for clearance is that, when valve/actuator is attached to the manway, the gap between the end of the valve stem of the valve/actuator and the corresponding contact surface on the checkvalve be 1/8 inch.

In replacing the valve, an operator can replace the gasket in the manway cover recess. Choosing the wrong gasket thickness will result in improper seating of the valve atop the railcar with the consequent improper gap. Presently, the gap size is "eyeballed" or the valve/actuator is placed upon the manway cover to check if the stem contacts the checkvalve, both imprecise and subjective methods.

SUMMARY OF THE INVENTION

The invention disclosed is a gauging device. The gauging device has a plate sized to attach to the manway cover and fit in the valve seating recess on the manway cover. The gauging device has a calibration member slidable in the plate and calibrated to indicate the desired gap between the checkvalve and an installed valve stem.

OBJECTS OF THE INVENTION

Accordingly, it is an object of the present invention to provide a gauging device to determine the proper seating of a valve/actuator in combination with a checkvalve of a tanker railcar.

It is another object of the invention to provide for a gauging device to determine the gap distance between a valve/actuator and a checkvalve attached to a tanker railcar.

It is another object of the invention to provide for a simple an inexpensive device to determine the proper operation of a valve/actuator in combination with a checkvalve of a tanker railcar.

It is another object of the invention to provide a gauging device easily interpreted for determining the proper operation of a valve/actuator in combination with a checkvalve of a tanker railcar.

DETAILED DESCRIPTION OF THE INVENTION

Figures 1, 2:
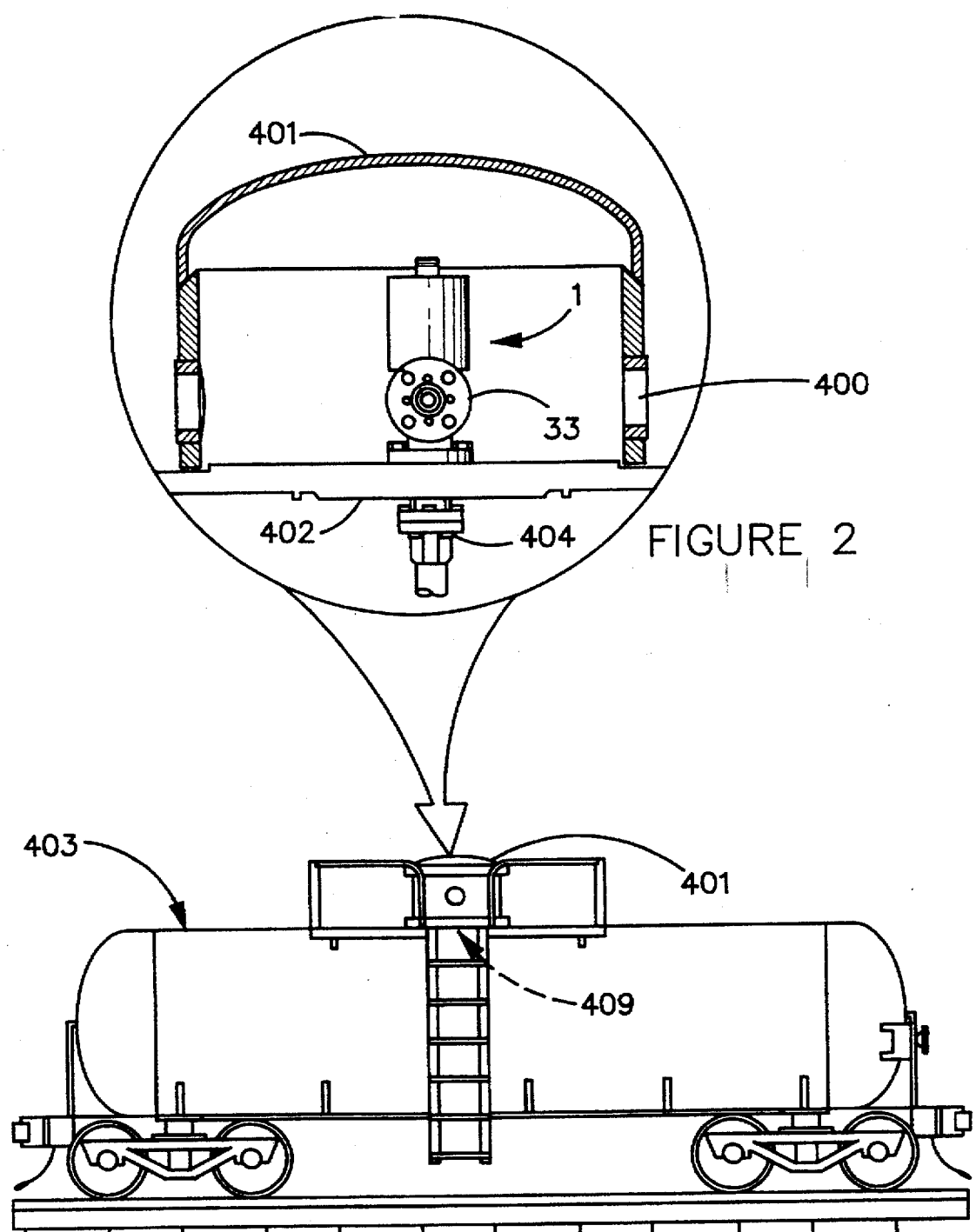
FIG. 1 is a perspective view of a tanker railcar with dome attached.
FIG. 2 is a sectional view of a tanker railcar dome.

Turning to the drawings, FIG. 1 shows a tanker railcar 403. Standard tanker railcars 403 have a tanker opening 409 in the top of the tanker to access the interior of the car. FIG. 1 also shows railcar dome 401 attached to tanker railcar 403. Railcar dome 401 covers and protects equipment, such as valves, placed therein.

FIG. 2 shows a sectional view through an attached railcar dome 401. Shown are dome port openings 400 through the railcar dome 401. Dome port openings 400 allow restricted access to the valves positioned inside the railcar dome 401 without removal of the railcar dome 401. Both the railcar dome 401 and dome port openings 400 are standard sizes as specified by the American Association of Railroads ("AAR"). Also shown is a valve/actuator 1 mounted on a manway 402. Manway 402 is a standard cover for the tanker opening 403. Finally, FIG. 2 shows an industry standard checkvalve 404 mounted on the manway 402 and extending downwardly into the interior of the tanker railcar 403.

Figure 3:
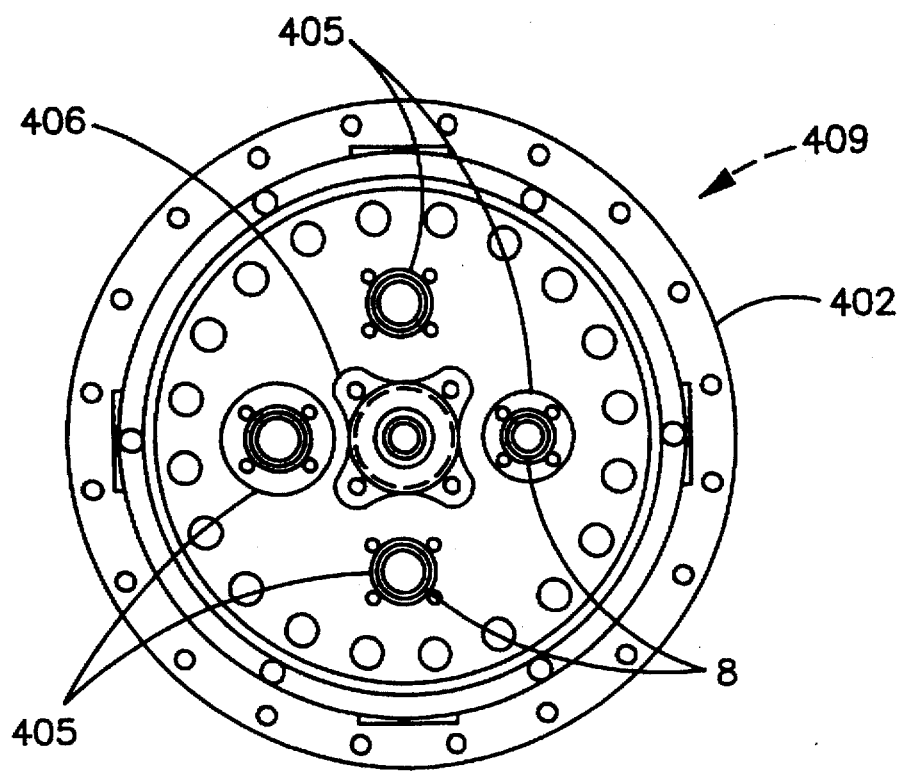
FIG. 3 is a top view of a manway.
Figure 4:
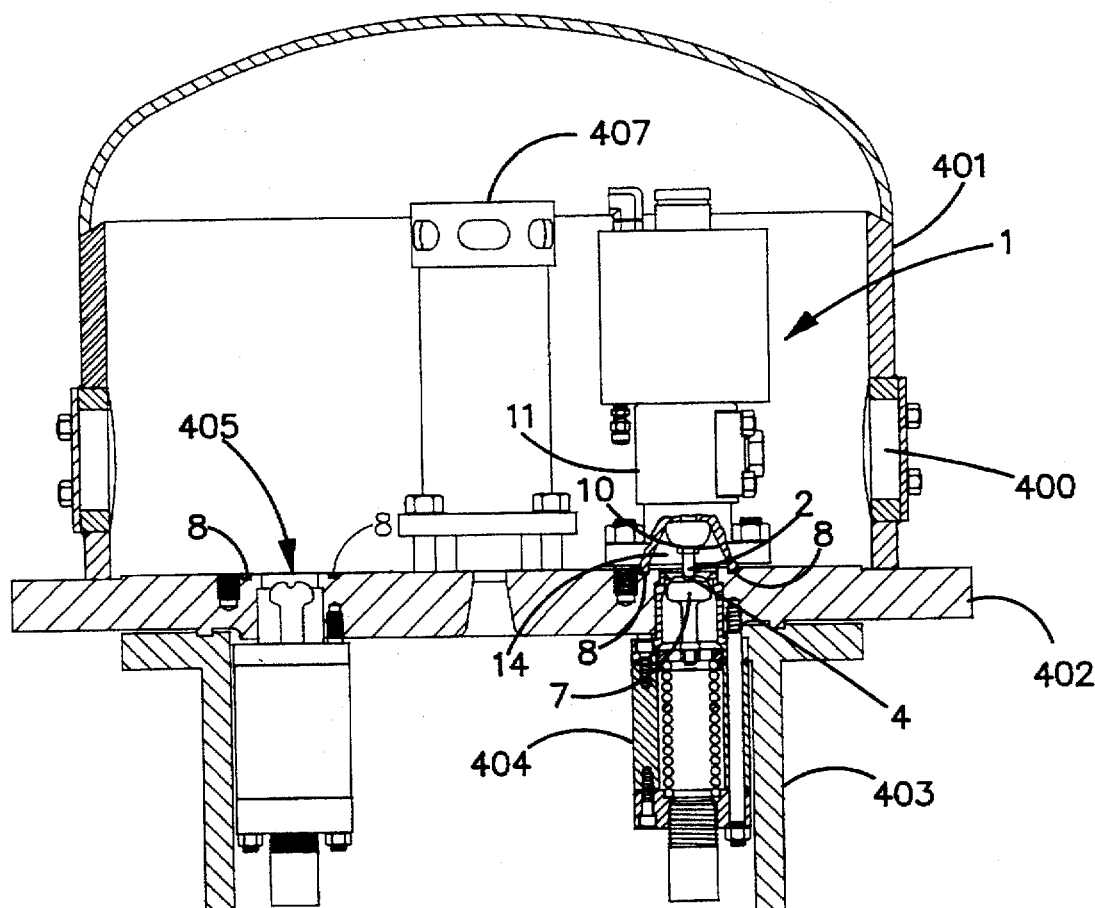
FIG. 4 is a partial sectional view of a tanker railcar dome.

FIG. 3 is a top view of a manway 402. Manway 402 has four attachment openings 405 to any one of which a valve/actuator 1 may be attached. Also shown is a safety release valve slot 406 for attachment of a safety release valve 407. FIG. 4 shows a partial cross section through an attached railcar dome 401 showing the manway 402, a cross section through a valve/actuator 1, and a safety release valve 407.

FIG. 4 shows a valve/actuator 1 attached to manway cover 402 and a checkvalve 404 mounted on the manway cover 402 and extending downwardly into the interior of the tanker railcar 403. Both the valve/actuator 1 and checkvalve 404 are normally closed. In operation, the actuator of the valve/actuator combination 1 is activated, forcing valve stem 2 downwardly, opening globe valve 3 of valve/actuator 1. As valve stem 2 moves downwardly, tip 4 of valve stem 2 contacts valve stem contact area 5 of checkvalve 404, opening checkvalve 404. Once checkvalve 404 and valve/actuator 1 are open, a fluid path into the interior of the railcar 403 is opened. With valve/actuator 1 and checkvalve 404 closed, it is preferred that a gap be maintained between the valve stem 2 and checkvalve 404 valve stem contact area 5. The Chlorine Institute recommends a gap size of ⅛ inch.

FIG. 4 also shows the valve mounting recess 8 in manway cover 402. Valve mounting recess 8 surrounds each attachment opening 405 in the manway cover 402. Generally, the valve mounting recess 8 is a circular recess, although the shape may vary. Valve mounting recess 8 is shaped to receive the mounting flange 10 of the housing 11 of the valve/actuator 1. It is preferred that a gasket 12 be placed in the valve mounting recess 8. In this fashion, when a valve/actuator 1 is attached (shown in FIG. 4 as bolted) to the manway cover 402, the gasket 12 in valve mounting recess 8 in combination with the mounting flange 10 sealing isolates the area 14 between the checkvalve valve seat and the valve/actuator valve seat.

Figure 5:
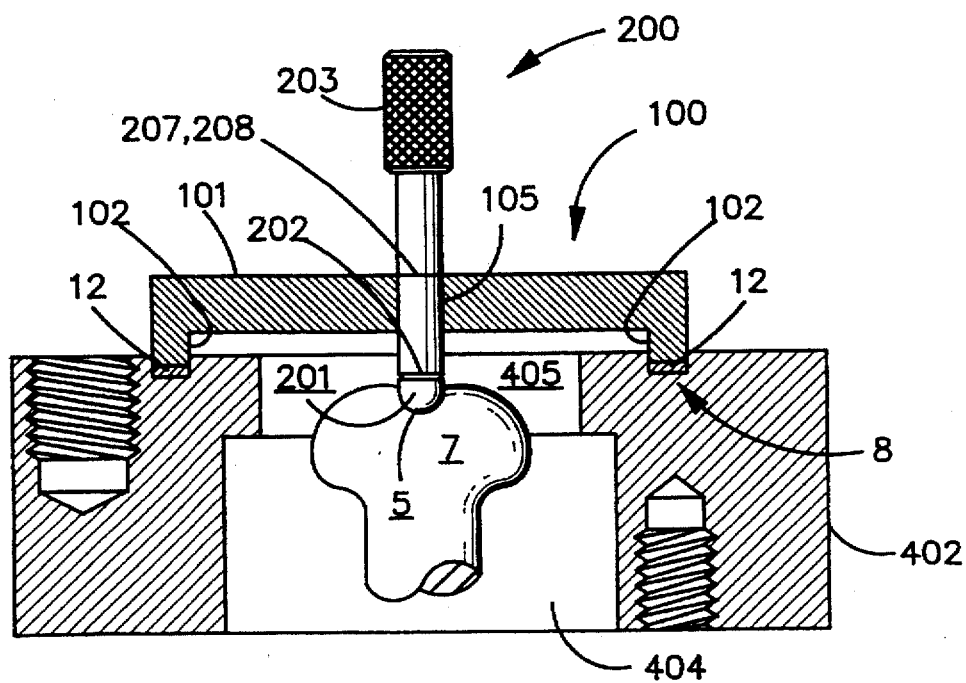
FIG. 5 is a cross sectional view of an embodiment of the invention.

FIG. 5 shows a cross-section through a portion of the manway cover 402. The valve stem contact area 5 is preferably constructed to allow the valve stem 2 to be self-centering upon engagement with valve stem contact area 5. As shown in FIG. 5, valve stem contact area 5 is a concave depression in the spindle 7 of the checkvalve 404, the depression being sized to accommodate the tip 4 of the valve/actuator valve stem 2. Other configurations of the valve stem contact 5 are possible. Also shown in FIG. 5 is valve mounting recess 8, and gasket 12. Shown engaging the valve mounting recess 8 is gauging device 100. Gauging device 100 has a plate 101. Plate 101 is shown as a flat member, but other configurations are possible, such as arched members. Plate 101 has ridges 102 sized to engage the valve mounting recess 8 in order to support the plate 100 above the opening 405 in the manway cover 402 when the gauging device 100 is in place.

Figure 6:
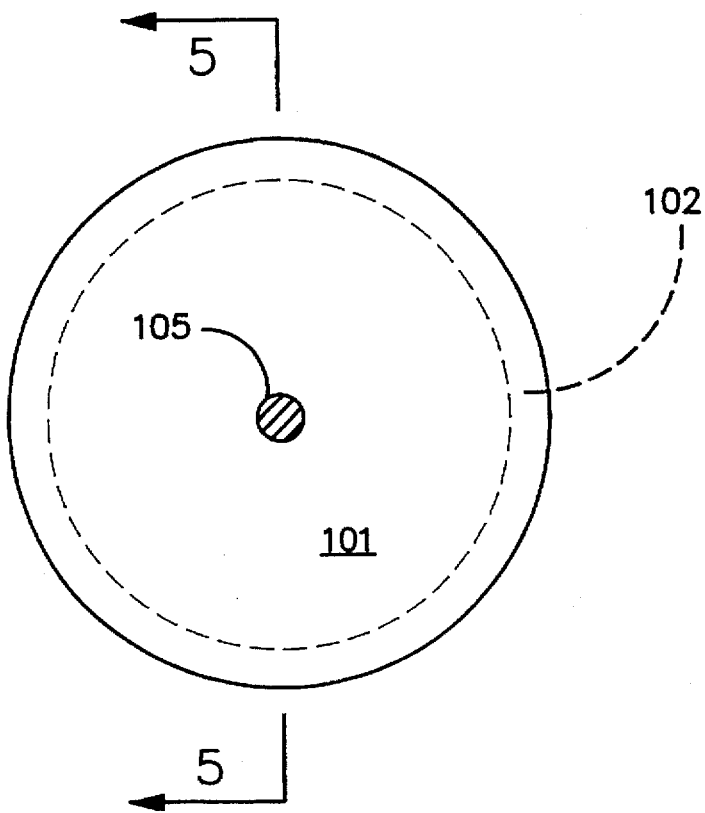
FIG. 6 is a top view of an embodiment of the invention.

FIG. 6 shows one shape of the plate 101, that shape being circular. However, any shape which bridges across the attachment opening 405 of the manway cover 402 and crosses near the location of the valve seat contact area 5 will suffice, such as a bar shaped plate or half circular shaped plate.

As shown in FIGS. 5 and 6, a preferred embodiment of the plate 101 has an opening 105 therethrough, the opening positioned to align with the valve stem contact area 5. Also shown in FIG. 5 is calibration member 200. Calibration member 200 is slidable in the opening 105 and has a calibration tip 201 adapted to engage the valve stem contact area 5. As shown, calibration member 200 has a snap rig recess 202 for placing a snap ring therein to prevent withdrawal of the calibration member from the plate 100. Calibration member 200 has a knurled handle 203 for easy gripping by an operator, and to prevent the calibration member 200 from being removed from plate 101. Finally, calibration member 200 has at least one indicia 207 placed thereon. As shown, indicia 207 is a line 208 inscribed in the calibration member 200. In operation, the gauging device 100 is installed and calibration member 200 lowered through opening 105 until calibration tip 201 contacts valve stem contact area 5. The line 208 is placed upon the calibration member 200 so that the line 208 will align with the top of the plate 101 if the distance between the line 208 and valve stem contact area 5 is as desired, as will be more fully explained.

When replacing a valve/actuator 1, the construction of the present invention assumes that the valve stem 2 of the valve/actuator 1 is properly set, that is, that portion of the valve stem 2 which projects into the attachment opening 405 of manway 402 is within specification. In operation, certain desired distances are known: distance A, the thickness of the proper gasket; distance B, the vertical distance between the top of plate 101 at opening 105 and bottom of ridges 102; distance C, the vertical distance from the bottom of the valve mounting recess 8 and the top of the checkvalve valve stem contact area 5; and distance D, the thickness of the plate 101 near the area of the calibration member 200. The indicia 207 indicating proper gap should thus be placed on the calibration member 200 at a distance B+A+C+ "desired gap" (usually ⅛ inch) above calibration tip 201 of calibration member 200. Alternatively, gauging device could be designed to seat in valve mounting recess 8 in the absence of a gasket. In this instance, the indicia 207 would be place a distance B+C+ "desired gap" above calibration tip 201. This method is not preferred as it does not verify that the proper gasket is installed in valve mounting recess 8.

Figure 7:
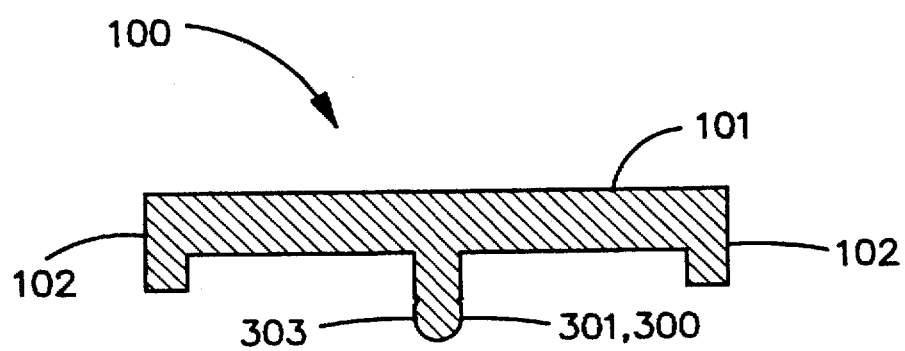
FIG. 7 is a cross sectional view of another embodiment of the invention.

Gauging device 100 may also have a calibration means 300 extending downwardly from that the plate 101 and adapted to indicate the distance between the calibration means 300 and the valve stem contact area 5. For instance, as shown in cross section in FIG. 7, plate 101 has calibration means 300 extending downwardly therefrom. As shown, calibration means 300 is a fingermember 301 having a tip 303 adapted to engage the valve stem contact area 5, and the fingermember's length is B+A+C+ "desired gap"—D (if the gauging device is to operate with a gasket in valve mounting recess 8), or B+C+ "desired gap"—D (if the gauging device 100 is to operate without gasket). In this embodiment, if the actual gap is too small, the gauging device 100 will not seat properly in the valve stem recess 8, but will "rock" because that the gaging device 100 is supported, in part, by the ridges 102, and in part by the contact between that the fingermember 301 and valve stem contact area 5. If the gap is too large, the plate 101 will flex when a downward force is applied to the plate 101 above the fingermember 301. Alternatively, calibration means 300 could be a powered microprocessor in connection with a source and receiver of suitable energy, such as radio or infrared radiation, such energy being emitted by the source and directed to the valve stem contact area 5, and upon reflection by the valve stem contact area 5, detected and the time of travel of the energy converted into a distance by the microprocessor, with a means for indicating the result to the operator.

I claim:

1. In a tanker railcar having a manway cover for attaching a valve having a valve stem, the manway cover having an opening and a valve mounting recess, a checkvalve positioned in said manway opening, said checkvalve having a valve stem contact area for engaging a valve stem, a method of gauging the desired relative position of a checkvalve contact area with respect to a valve stem comprising the steps of:

a) placing a reference means upon said manway cover;

b) accurately measuring the distance between said reference means and said valve stem contact are of said checkvalve;

c) comparing said measured distance against a desired predetermined length.

2. A method of gauging the desired relative position of a checkvalve according to claim 1 wherein said reference means comprises a plate, said plate sized to fit across said manway cover opening and engage said valve mounting recess on said manway cover.

3. A method of gauging the desired relative position of a checkvalve according to claim 2 wherein said reference means further has an opening substantially alignable with said valve stem contact area and said step of measuring the distance between said plate and said valve stem contact area is accomplished by providing a calibration member slidable in said opening, said calibration member having one end adapted to engage said valve stem contact area of said check valve, said member having at least one indicia placed thereon, said indicia for indicating the relative position of said valve stem contact area with respect to a valve stem, and sliding said calibration member downwardly in said opening until said end of said calibration member contacts said valve stem contact area of said checkvalve.

4. A method of gauging the desired relative position of a checkvalve according to claim 3 wherein said at least one of said indicia is a desired indicia, and said step of comparing said measured distance against a desired predetermined length comprises comparing the position of said desired indicia with respect to the surface of said plate.

5. A gauging device for use in a tanker railcar having a manway cover for attaching a valve having a valve stem, the manway cover having an opening and a valve mounting recess, a checkvalve positioned in the manway opening, the checkvalve having a valve stem contact area for engaging the valve stem, said gauging device comprising:
(A) a plate, said plate sized to fit across the manway cover opening and engage the valve mounting recess on the manway cover;
(B) a calibration means positioned on and extending downwardly from said plate, said calibration means adapted to indicate the distance between said calibration means and the valve stem contact area.

6. A gauging device according to claim 5 wherein said calibration means is a fingermember, said fingermember positioned on said plate to contact the checkvalve valve stem contact area, said member having a predetermined length.

7. A gauging device for use in a tanker railcar having a manway cover for attaching a valve having a valve stem, the manway cover having an opening and a valve mounting recess, a checkvalve positioned in the manway opening, the checkvalve having a valve stem contact area for engaging the valve stem, said gauging device comprising:
(A) a plate, said plate sized to fit across the manway cover opening and engage the valve mounting recess on the manway cover, said plate having an opening therethrough, said opening positioned to substantially align with the valve stem contact area of a checkvalve;
(B) a calibration member slidable in said opening, said calibration member having one end adapted to engage the valve stem contact area of a check valve, said member having at least one indicia placed thereon, said indicia for indicating the relative position of a checkvalve contact area with respect to a valve stem.

8. A gauging device according to claim 7 wherein said plate has at least one ridge, said ridge sized to engage the valve mounting recess area of a manway cover.

9. A gauging device according to claim 7 wherein said indicia indicates the desired relative position of a checkvalve contact area with respect to a valve stem.

10. In a tanker railcar having a manway cover for attaching a valve having a valve stem, the manway cover having an opening and a valve mounting recess, a checkvalve positioned in the manway opening, the checkvalve having a valve stem contact area for engaging a valve stem, a gauging device comprising:
(A) a plate, said plate sized to fit across said manway cover opening and engage said valve mounting recess on said manway cover, said plate having an opening therethrough, said opening positioned to substantially align with said valve stem contact area of said checkvalve;
(B) a calibration member slidable in said opening, said calibration member having one end adapted to engage said valve stem contact area of said check valve, said member having at least one indicia placed thereon, said indicia for indicating the relative position of said checkvalve contact area with respect to said valve stem.

11. In a tanker railcar having a manway cover for attaching a valve having a valve stem, the manway cover having an opening and a valve mounting recess, a checkvalve positioned in the manway opening, the checkvalve having a valve stem contact area for engaging a valve stem, a gauging device comprising:
(A) a plate, said plate sized to fit across that the manway cover opening and engage that the valve mounting recess on that the manway cover;
(B) a calibration means positioned on and extending downwardly from said plate, said calibration means adapted to indicate that the distance between said calibration means and the valve stem contact area.

* * * * *